United States Patent [19]
Metro et al.

[11] Patent Number: 5,837,766
[45] Date of Patent: Nov. 17, 1998

[54] COMPOSITION FOR ELECTRODEPOSITING MULTIPLE COATINGS ONTO A CONDUCTIVE SUBSTRATE

[75] Inventors: James N. Metro, Riverdale; Ronald Mattiuz, Downers Grove, both of Ill.

[73] Assignee: The Sherwin-Williams Company, Cleveland, Ohio

[21] Appl. No.: 855,692

[22] Filed: May 14, 1997

[51] Int. Cl.⁶ ............................... C08K 3/04; H01B 1/24
[52] U.S. Cl. ........................ 524/495; 524/496; 524/901; 252/511
[58] Field of Search ................................... 524/495, 496, 524/901; 428/461; 252/511

[56] References Cited

U.S. PATENT DOCUMENTS

| | | | |
|---|---|---|---|
| 3,674,671 | 7/1972 | Stromberg | 204/181 |
| 3,717,509 | 2/1973 | Palm et al. | 148/6.2 |
| 3,849,141 | 11/1974 | Palm et al. | 106/1 |
| 3,953,391 | 4/1976 | Dowbenko et al. | 260/29.6 TA |
| 3,990,920 | 11/1976 | DeRidder et al. | 148/6.2 |
| 4,304,703 | 12/1981 | Das | 260/29.6 |
| 4,346,143 | 8/1982 | Young, Jr. et al. | 428/332 |
| 4,419,467 | 12/1983 | Wismer et al. | 523/414 |
| 4,668,360 | 5/1987 | Mels et al. | 204/181.7 |
| 4,756,975 | 7/1988 | Fujii et al. | 428/461 |
| 4,818,356 | 4/1989 | Geist et al. | 204/181.1 |
| 4,830,778 | 5/1989 | Yamamoto et al. | 252/511 |
| 4,874,818 | 10/1989 | Yamamoto et al. | 525/183 |
| 4,882,090 | 11/1989 | Batzill et al. | 252/511 |
| 4,883,834 | 11/1989 | Yamamoto et al. | 524/504 |
| 4,962,139 | 10/1990 | Lo | 523/468 |
| 4,981,759 | 1/1991 | Nakatani et al. | 428/626 |
| 5,059,492 | 10/1991 | Shindou et al. | 428/625 |
| 5,104,507 | 4/1992 | Offenburger | 204/180.6 |
| 5,104,583 | 4/1992 | Richardson | 252/518 |
| 5,178,736 | 1/1993 | Richardson | 204/181.1 |
| 5,203,975 | 4/1993 | Richardson | 204/181.1 |
| 5,378,335 | 1/1995 | Hoppe-Hoffler et al. | 204/181.7 |
| 5,492,614 | 2/1996 | Zawacky et al. | 205/224 |
| 5,530,043 | 6/1996 | Zawacky et al. | 524/317 |
| 5,556,913 | 9/1996 | Tobinaga et al. | 524/901 |

*Primary Examiner*—Tae Yoon
*Attorney, Agent, or Firm*—Heidi A. Boehlefeld; Robert E. McDonald; Vivien Y. Tsang

[57] ABSTRACT

The present invention relates to an electrodepositable conductive coating composition which contains at least one cationic acrylic polymer, a crosslinking agent and conductive carbon black having an average particle size of about 20 nm or less, a surface area (BET) of about 240–300 m²/g and an oil absorption (DBP) of about 100 to 150 ml/100 g. After curing, the conductive coating can be electrocoated with an electrodepositable topcoat having a defect-free appearance and a high degree of gloss.

3 Claims, No Drawings

COMPOSITION FOR ELECTRODEPOSITING MULTIPLE COATINGS ONTO A CONDUCTIVE SUBSTRATE

The present invention relates to an electrodepositable conductive primer coating which can be electrocoated with an electrodepositable topcoat.

BACKGROUND OF THE INVENTION

The coating of conductive substrates by electrodeposition is a well known and important industrial process. Electrodeposition is widely used in the automotive and related off-road vehicle industries to apply primers and topcoats onto conductive substrates.

Generally, there are two types of electrodeposition processes—anodic electrodeposition and cathodic electrodeposition. Both methods are performed by inducing an electrical current within a coating cell containing a coating compound. Cathodic electrodeposition is accomplished by first immersing the part to be coated into an electrolytic solution containing the coating composition. A negative charge is imparted onto the conductive substrate to be coated. The positively charged ionic species of the coating composition then move through the electrolyte medium via means of the electrophoretic phenomenon so as to coat the substrate. Anodic electrodeposition brings about similar results by reversing the electrical polarity so that the substrate to be coated acts as an anode and attracts negatively charged ions of the coating composition.

Cathodic electrodeposition generally provides better gloss and color retention characteristics than anodic electrodeposition, as well as superior coating thickness capabilities. Typical commercial cathodic electrodeposition films are not conductive after cure. However, having a conductive electrodeposited film can be advantageous for a number of reasons. For instance, a conductive film permits the electrodeposition of another layer over the initial electrodeposited layer. Multiple electrodeposited layers can be beneficial since most commercial cathodic electrodeposition systems have certain practical limits to the amount of film build obtainable, and during the cure there is a tendency for the film to pull away from sharp edges thereby reducing edge corrosion protection. One way of increasing the film build and improving edge coverage is by electrodepositing another layer over the initial cured film. But in order to electrodeposit an additional coating, it is necessary that the initial coating have sufficient conductivity to allow the electrodeposition of another layer to occur.

The present invention is directed to a conductive electrodepositable coating composition containing conductive carbon black. The use of carbon black in electrodepositable coatings is generally known. However, the use of carbon black in such coatings is also known to result in surface flaws of the deposited coatings. Surface flaws such as roughness, pin holes, craters and crawling reduce the protection against corrosion and adversely affect the appearance of the electrodeposited top coat. Nevertheless, it has been discovered that a coating composition containing a certain conductive carbon black results in a smooth coating, over which a relatively thick top coat having a defect-free appearance and a high degree of gloss may be electrodeposited.

The present invention involves the sequential steps of cathodically electrodepositing a first conductive composition layer onto a metallic substrate, thermally curing the cathodically coated substrate, and then optionally cathodically electrodepositing a second composition layer onto the conductive coated substrate and thermally curing the second layer.

SUMMARY OF THE INVENTION

The present invention is directed to an electrodepositable aqueous coating composition comprising (a) at least one cationic acrylic polymer; (b) a crosslinking agent; and (c) conductive carbon black having an average particle size of about 20 nm or less, a surface area (BET) of about 240 to 300 $m^2/g$ and an oil absorption (DBP) of about 100 to 150 ml/100 g; wherein the conductive carbon black is in an amount of 4.5 to 6.5% by weight based on total solids content of the coating composition. After the electrodeposition of this coating composition onto a conductive substrate, the coating is thermally cured and may be overcoated with an additional electrodepositable top coat.

DETAILED DESCRIPTION OF THE INVENTION

The conductive coating composition of the present invention is useful as a primer coating wherein additional coatings are electrodeposited onto the conductive primer coated substrate. The first coat and those applied subsequently can be distinguished by their pigmentation. In addition to functioning as a primer coating, the coating composition of the present invention may function as the sole pigmented coating on the substrate.

The electrodepositable coating composition of the present invention generally contains at least one binder resin, a crosslinking agent and a conductive pigment. Acrylic resins are preferred as the binder resin, since the coating applied onto the substrate must be decorative and because it may be directly exposed to weathering and sunlight. The coatings applied on top of the first conductive coat may contain the same binders as the first coat, i.e., acrylic resins. The top coat and primer compositions need not contain identical binders, but must be compatible to have acceptable intercoat adhesion.

Binder Resins

The binder resin of the present invention comprises at least one cationic acrylic polymer. These acrylic polymers are prepared by the addition polymerization of ethylenically unsaturated monomers such as alkyl acrylates and methacrylates including methyl methacrylate, butyl methacrylate, hexyl methacrylate, octyl methacrylate, isodecyl methacrylate, stearyl methacrylate, methyl acrylate, ethyl acrylate, butyl acrylate, hexyl acrylate, 2-ethylhexyl acrylate, octyl acrylate, decyl acrylate and dodecyl acrylate; hydroxyalkyl esters such as hydroxyethyl and hydroxypropyl acrylate and methacrylate; and amides of acrylic acid and methacrylic acid such as acrylamide and methacrylamide and their N-alkoxymethyl derivatives thereof such as N-ethoxy and N-butoxy acrylamide and methacrylamide.

The acrylic functional monomers may be copolymerized with other ethylenically functional monomers such as, for example, vinyl aromatic compounds including styrene, alpha-methyl styrene, alpha-chloro styrene and vinyl toluene; and aminoalkyl esters of acrylic acid and methacrylic acid including aminomethyl, aminoethyl, aminopropyl, aminobutyl and aminohexyl esters, and N,N-dimethylamino ethyl ester, (N-methyl-N-butylamino)-ethyl ester and (N,N-dimethylamino)-hexyl ester.

The acrylic polymers can be prepared by conventional free radical initiated polymerization techniques in which the polymerizable monomers are polymerized in the presence of a free radical initiator until conversion is complete. Examples of free radical initiators are those which are soluble in the mixture of monomers such as azobisisobutyronitrile, azobis(alpha, gamma-dimethylvalcronitrile), tertiary-butyl perbenzoate, tertiary-butyl peroctoate, benzoyl peroxide and ditertiary-butyl peroxide.

The preferred cationic acrylic resin comprises the reaction product of (a) at least one alkyl ester of acrylic acid or methacrylic acid; (b) at least one vinyl aromatic compound; (c) at least one hydroxyalkyl ester of acrylic acid or methacrylic acid; and (d) at least one aminoalkyl ester of acrylic acid or methacrylic acid. A particularly preferred cationic acrylic resin useful in the coating composition of the present invention comprises:

|  | Wt. % |
| --- | --- |
| butyl acrylate | 5–40 |
| methyl methacrylate | 0–15 |
| styrene monomer | 15–40 |
| dimethylamino ethyl methacrylate | 5–10 |
| hydroxyethyl acrylate | 5–20 |
| azobisisobutyronitrile | 0.5–4 |
| butyl cellosolve | 0–15 |

Crosslinking Agent

Preferred crosslinking agents are blocked polyisocyanates. With the binders, it is possible to use any desired polyisocyanate where the isocyanate groups have been reacted with a compound, so that the blocked polyisocyanate formed is resistant to hydroxyl groups at room temperature, but reacts at elevated temperatures within the range from about 195° to about 570° F. In the preparation of blocked polyisocyanates, preference is given to isocyanates which contain about 3 to 36, and in particular about 8 to about 15 carbon atoms. Examples of suitable diisocyanates are trimethylene diisocyanate, tetramethylene diisocyanate, pentamethylene diisocyanate, hexamethylene diisocyanate, propylene diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-toluylene diisocyanate, 2,6-toluylene diisocyanate, 4,4-diphenylene diisocyanate, 1,5-naphthylene diisocyanate, 1,4-naphthylene diisocyanate, 1-isocyanatomethyl-5-isocyanato-1,3,3-trimethylcyclohexane, bis(4-isocyantocyclohexyl)methane, bis(4-isocyantophenyl)methane, 4,4'-diisocyanatodiphenyl ether and 2,3-bis(8-isocyanatooctyl)-4-octyl-5-hexylcylcohexane.

It is also possible to use polyisocyanates of higher isocyanate functionality. Examples thereof are tris(4-isocyanatophenyl)methane, 1,3,5-triisocyanatobenzene, 2,4,6-triisocyantotoluene, 1,3,5-tri(6-isocyanatohexylbiuret), bis(2,5-diisocyanato-4-methylphenyl)methane and polymeric polyisocyanates, such as dimers and trimers. It is further possible to use mixtures of polyisocyanates. The organic polyisocyanates which come into consideration for use as crosslinking agents in the invention can also be prepolymers which are derived for example from a polyol, including a polyether polyol or a polyester polyol.

To block the polyisocyanates it is possible to use any desired suitable aliphatic, cycloaliphatic or aromatic alkyl monoalcohols. Examples thereof are aliphatic alcohols, such as methyl, ethyl, chloroethyl, propyl, butyl, amyl, hexyl, heptyl, octyl, nonyl, 3,3,5-trimethylhexyl, decyl or lauryl alcohol, cycloaliphatic alcohols such as cyclopentanol and cyclohexanol, aromatic alkyl alcohols, such as phenylcarbinol and methylphenylcarbinol.

Other suitable blocking agents are hydroxylamines such as ethanolamine, oximes such as methyl ethyl ketone oxime, acetone oxime and cyclohexanone oxime, amines such as dibutylamine and diisopropylamine, or caprolactam.

Conductive Pigment

The electroconductive pigment of the invention is carbon black having an average particle size of 20 nm or less, a surface area (BET) of 240–300 m2/g, and an oil absorption (DBP) of 100–150 ml/100 g. A conductive carbon black found to be particularly useful has an average particle size of 18 nm, a surface area (BET) of 265 $m^2/g$, and an oil absorption (DBP) of 120 ml/100 g (according to ASTM D2414). Such a carbon black is available in bead form from Degussa under the name PRINTEX L6.

The coating composition of the present invention generally comprises about 4.5–6.5% by weight of conductive carbon black, based on the solids content of the coating composition. Preferably, the coating composition comprises about 5% by weight of conductive carbon black based on the solids content of the composition. A carbon black content greater than about 6.5% by weight based on the solids content of the coating composition generally produces cured coatings having unacceptable surface defects.

Supplemental pigments and extenders can also be used in conjunction with the conductive pigment to decrease the gloss of the coating and enhance corrosion protection. The supplemental pigments which can be employed include silica, clay and the like.

Electrodeposition Process

The electrodepositable coating compositions of the present invention are dispersed in aqueous medium. Besides water, the aqueous medium may also contain a coalescing solvent. Useful coalescing solvents include hydrocarbons, alcohols, esters, ethers and ketones. Specific coalescing solvents include isopropanol, butanol, 2-ethylhexanol, isophorone, 4-methoxy-pentaone, ethylene and propylene glycol and the monoethyl, monobutyl and monohexyl ethers of ethylene glycol.

Virtually any conductive substrate can be coated by the process according to the invention. Customarily they are metal substrates, for example iron, steel, copper, zinc, brass, tin, nickel, chromium or aluminum, which can be phosphatized, chromatized or otherwise pretreated.

The conditions under which electrodeposition is carried out are, in general, similar to those used in electrodeposition of other types of coatings. The temperature of the electrodeposition bath is generally between 75° and 95° F. The applied voltage may be varied greatly and can be, for example, as low as one volt or as high as several thousand volts, although typically between about 50 volts and 500 volts are employed. Preferably, the applied voltage is between about 75 and 200 volts and the conductive composition is electrodeposited for about 1.5–3 minutes.

After deposition, the conductive coating is dried or cured at elevated temperatures by any convenient method, such as by baking in an oven. Curing temperatures depend principally on the curing agent employed. When the curing agent is a blocked isocyanate such as described above, curing is usually accomplished by baking in an oven at a temperature of between about 300° and 400° F. for about 5–30 minutes.

The thickness of the coating deposited on the article is a function of the bath characteristics, the electrical operating characteristics, the immersion time and the like.

The conductivity of the cured conductive primer coating may be measured using the Ransburg meter which is calibrated in "Ransburg Units" (RU) on a scale of 65–165. A minimum reading of 130 RU is generally needed to cathodically electrodeposit a high quality topcoat layer onto the conductive primer layer. Preferably, the conductivity of the conductive primer is about 140 RU.

The top coat is electrodeposited over the conductive primer coating on the substrate using the same electrocoating process described above to apply the conductive primer layer and baked under the same conditions to form a cured finish having excellent appearance and good physical properties. The dry film thickness of the conductive primer coating is about 0.8 to 1.8 mils. The dry film thickness of topcoat is about 1.0 to 2.4 mils. The 20° gloss of the cured top coat is about 65 to 80%.

The distinctness of image (DOI) of the cured topcoat is at least 60. The DOI was measured by the projection of various size broken rings, known as Landolt rings, onto the cured topcoat surface. A value of 100 is assigned to the smallest set of rings and incrementally smaller values to the uniformly increasing larger rings. The image of the reflected rings on the topcoat surface was observed at a specified distance and the films assigned a DOI value of the number corresponding to the smallest set of rings in which the break is discernible. The DOI is directly related to the smoothness of the electrodeposited coating. The smoother the coating, the higher the DOI.

The following examples illustrate the invention. All parts and percentages are on a weight basis unless otherwise indicated.

Example A

Preparation of Cationic Acrylic Resin

A cationic acrylic resin was prepared by conventional polymerization reaction at 230° F. The ingredients used are given below. The resulting acrylic resin had an NVM (weight percentage of nonvolatile materials) of 71.5%.

| | Wt. % |
|---|---|
| 2-butoxy ethanol butyl cellosolve | 24.7 |
| butyl acrylate | 32.9 |
| dimethylamino ethyl methacrylate | 7.3 |
| styrene monomer | 18.3 |
| hydroxyethyl acrylate | 14.6 |
| azobisisobutyronitrile | 2.2 |

Example B

Preparation of Cationic Acrylic Resin

A cationic acrylic resin was prepared by conventional polymerization reaction at 230° F. The ingredients used are given below. The resulting acrylic resin had an NVM (weight percentage of nonvolatile materials) of 60.5%.

| | Wt. % |
|---|---|
| 2-butoxy ethanol butyl cellosolve | 35.5 |
| butyl acrylate | 6.2 |
| styrene monomer | 29.2 |
| dimethylaminoethyl methacrylate | 5.9 |
| hydroxyethyl acrylate | 10.0 |
| methylmethacrylate | 5.9 |
| azobisisobutyronitrile | 1.4 |
| hydroxypropyl acrylate | 2.0 |
| 2-butoxyethyl acetate | 3.8 |

Example C

Preparation of Crosslinking Agent

A blocked isocyanate crosslinking agent was prepared by reacting the following in propylene glycol monomethyl ether acetate:

| | Wt. % |
|---|---|
| caprolactam | 30.9 |
| Desmodur N-751 | 69.1 |

Example D

Preparation of Conductive Primer Electrodeposition Bath

A conductive primer electrodeposition bath was prepared by first preparing a make-up bath solution containing Cationic Acrylic Resins A and B, crosslinking agent, conductive pigment, coalescing solvent, additional pigments and fillers, and neutralizing agent, and thereafter diluting the make-up solution with deionized water. The composition of the make-up solution was as follows:

| | Wt. % |
|---|---|
| Crosslinking Agent C | 24.8 |
| Cationic Acrylic Polymer B | 18.7 |
| Butyl Cellosolve | 8.7 |
| Printex L6 | 3.4 |
| Pine Oil | 0.5 |
| Clay | 1.9 |
| Syloid (silica) | 2.9 |
| Cationic Acrylic Polymer A | 38.1 |
| Phosphoric Acid | 0.4 |
| Lactic Acid | 0.4 |

To one part make-up solution was added three parts (by volume) of deionized water to reduce the NVM of the diluted bath to about 13.0 to 13.5%. The diluted bath was then stirred in an open vessel for about 24 hours to allow the electrodeposition bath to become a homogeneous solution and reach equilibrium prior to electrocoating.

The temperature of the bath was about 80° F., and the prepared phosphated steel panels were cathodically electrocoated using 50–225 volts for 2 minutes and rinsed. The panels were baked for about 20 minutes at 380° F. to give a coating having a dry film thickness of 1.0–1.5 mils.

Example E

Preparation of Topcoat Electrodeposition Bath

A topcoat electrodeposition bath was prepared by first preparing a make-up bath solution containing Cationic Acrylic Resin A, crosslinking agent, pigments and fillers, coalescing solvent, and neutralizing agent, and thereafter diluting the concentrated bath solution with deionized water. The composition of the make-up solution was as follows:

|  | Wt. % |
|---|---|
| Crosslinking Agent A | 28.3 |
| Butyl Cellosolve | 3.2 |
| Pine Oil | 1.2 |
| BYK VP320 (organosiloxane) | 1.1 |
| Cationic Acrylic Polymer A | 59.6 |
| Pigment | 5.4 |
| Phosphoric Acid | 0.6 |
| Lactic Acid | 0.6 |

To one part of make-up solution was added five parts (by volume) of deionized water to reduce the NVM of the diluted bath to 10.0–10.5%. The diluted bath was then stirred in an open vessel for about 24 hours to allow the electrodeposition bath to become a homogeneous solution and reach equilibrium prior to electrocoating.

The zinc phosphated cold rolled steel panels that had been coated, rinsed and baked in Example D with film builds of 1.0–1.5 mils were immersed in the topcoat electrodeposition bath of Example E and cathodically re-electrocoated by applying 100–225 volts for about 2 to 3 minutes. After rinsing, these panels were thermally cured by placing the panels in an oven at 380° F. for about 20 minutes, to give a total dry film build of about 2.5 to 3.6 mils. The resulting cured coating had a 20° gloss of 74%.

Comparative Examples

Several conductive carbon blacks were used to make conductive coating compositions. Table I contains the properties of these carbon blacks.

TABLE I

| Carbon Black | Supplier | DBP absorption (ml/100 g) | Particle Size (nm) | BET surface area (m²/g) | Ash Content (%) |
|---|---|---|---|---|---|
| XE2 | Degussa | 400 | 35 | 1000 | 0.7 |
| L6 | Degussa | 120 | 18 | 265 | 0.2 |
| Conductex 975 Ultra | Columbian | 170 | 21 | 270 | 1.0 |
| Conductex SC Ultra | Columbian | 115 | 20 | 220 | 1.5 |
| Black Pearls 2000 | Cabot | 330 | 12 | 1500 | 1.21 |
| Vulcan XC72 | Cabot | 192 | 30 | 254 | 0.03 |
| Vulcan PA90 | Cabot | 116 | 17 | 140 | 0.01 |
| Acethylene Black | Chevron | 390 | 42 | 80 | 0.001 |

Each of these carbon blacks was incorporated into the make-up solution for the conductive primer electrodeposition bath which was used to electrodeposit a conductive layer onto prepared phosphated steel panels in accordance with the process of Example D. Table II gives the results of the evaluation of the conductive coatings containing each of the conductive carbon blacks.

TABLE II

| Carbon Black | Acceptability of Primer Coating | Reason |
|---|---|---|
| XE2 | Unacceptable | Too textured |
| L6 | Acceptable | Smooth, Topcoat has excellent appearance, passed corrosion testing[1], passes hydrolytic stability testing[2] |
| Conductex 975 Ultra | Unacceptable | Fails hydrolytic stability testing[2] |
| Conductex SC Ultra | Unacceptable | Too textured |
| Black Pearls 2000 | Unacceptable | Failed corrosion testing[1] |
| Vulcan XC72 | Unacceptable | Too textured |
| Vulcan PA90 | Unacceptable | Too textured |
| Acethylene Black | Unacceptable | Unacceptable plating characteristics, i.e., non-uniform film build, non-continuous film |

[1]To pass corrosion testing, the coating must have <3 mm creep/scribe after 192 hours of salt spray according to ASTM B117.
[2]To pass hydrolytic stability testing, the electrodeposition bath must be substantially free of pigment settling or separation after a minimum of 4 weeks of static pumping and produce no substantial decrease in the appearance and performance characteristics of the deposited coating.

Of the conductive blacks evaluated, only the conductive carbon black having an average particle size of about 20 nm or less, a surface area (BET) of about 240 to 300 m²/g and an oil absorption (DBP) of about 100 to 150 ml/100 g produced acceptable conductive primer coatings.

I claim:

1. An electrodepositable aqueous coating composition comprising:
    (a) at least one cationic hydroxy functional acrylic polymer;
    (b) a crosslinking agent comprising a blocked isocyanate; and
    (c) conductive carbon black having an average particle size of about 20 nm or less, a surface area (BET) of about 240 to 300 m²/g, and an oil absorption (DBP) of about 100 to 150 ml/100 g in an amount of 4.5 to 6.5% by weight based on total solids of the coating composition.

2. The coating composition of claim 1 wherein said conductive carbon black comprises carbon black having an average particle size of about 18 nm, a surface area (BET) of about 265 m²/g and an oil absorption (DBP) of about 120 ml/100 g.

3. The coating composition of claim 1 wherein said cationic acrylic polymer comprises the reaction product of:
    (a) at least one alkyl ester of acrylic acid or methacrylic acid;
    (b) at least one vinyl aromatic compound;
    (c) at least one hydroxyalkyl ester of acrylic acid or methacrylic acid; and
    (d) at least one amino alkyl ester of acrylic acid or methacrylic acid.

* * * * *